United States Patent
Wu (10) Patent No.: US 11,252,628 B2
(45) Date of Patent: Feb. 15, 2022

(54) DEVICE AND METHOD FOR HANDLING NEW RADIO CAPABILITIES

(71) Applicant: HTC Corporation, Taoyuan (TW)

(72) Inventor: Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 16/241,887

(22) Filed: Jan. 7, 2019

(65) Prior Publication Data
US 2019/0215747 A1 Jul. 11, 2019

Related U.S. Application Data

(60) Provisional application No. 62/615,941, filed on Jan. 10, 2018, provisional application No. 62/615,410, filed on Jan. 9, 2018.

(51) Int. Cl.
*H04W 8/24* (2009.01)
*H04W 36/28* (2009.01)
(Continued)

(52) U.S. Cl.
CPC ............ *H04W 36/28* (2013.01); *H04W 8/24* (2013.01); *H04W 36/0066* (2013.01);
(Continued)

(58) Field of Classification Search
CPC ............................ H04W 36/28; H04W 36/385
See application file for complete search history.

(56) References Cited

U.S. PATENT DOCUMENTS 10,973,066 B2 * 4/2021 Kusashima ............ H04W 16/32
11,032,783 B2 * 6/2021 Kubota ................. H04W 48/16
(Continued)

FOREIGN PATENT DOCUMENTS

CN 105744626 A 7/2016
CN 107360562 A 11/2017
(Continued)

OTHER PUBLICATIONS

3GPP TS 36.331 V15.0.0 (Dec. 2017); Technical Specification; 3rd Generation Partnership Project; Technical Specification Group Radio Access Network; Evolved Universal Terrestrial Radio Access (E-UTRA); Radio Resource Control (RRC); Protocol specification; (Release 15).
(Continued)

*Primary Examiner* — Parth Patel
(74) *Attorney, Agent, or Firm* — Winston Hsu (57) ABSTRACT

A method for handling NR capabilities comprises the first BS transmitting at least one E-UTRA capability and at least one first NR capability of a communication device to the second BS; the second BS generating a RRC Connection Reconfiguration message according to the at least one E-UTRA capability and the at least one first NR capability, wherein the RRC Connection Reconfiguration message comprises at least one E-UTRA configuration and a NR configuration; the second BS transmitting the RRC Connection Reconfiguration message to the first BS; the first BS generating a first NR-access RRC message comprising the RRC Connection Reconfiguration message; the first BS transmitting the first NR-access RRC message to the communication device; and the second BS receiving a RRC Connection Reconfiguration Complete message from the communication device.

10 Claims, 5 Drawing Sheets

(51) Int. Cl.
*H04W 36/00* (2009.01)
*H04W 76/27* (2018.01)
*H04W 36/38* (2009.01)
*H04W 88/10* (2009.01)
*H04W 36/08* (2009.01)

(52) U.S. Cl.
CPC ......... *H04W 36/385* (2013.01); *H04W 76/27* (2018.02); *H04W 88/10* (2013.01); *H04W 36/0022* (2013.01); *H04W 36/0033* (2013.01); *H04W 36/08* (2013.01)

(56) References Cited

U.S. PATENT DOCUMENTS

| | | | |
|---|---|---|---|
| 2010/0075679 A1 | 3/2010 | Tenny | |
| 2014/0086173 A1* | 3/2014 | Sadeghi | H04L 5/003 370/329 |
| 2016/0157140 A1* | 6/2016 | Tiwari | H04W 36/0055 455/436 |
| 2017/0303114 A1* | 10/2017 | Johansson | G10L 19/002 |
| 2017/0325281 A1 | 11/2017 | Hong | |
| 2017/0332295 A1* | 11/2017 | Sunay | H04W 36/08 |
| 2018/0084539 A1* | 3/2018 | Kubota | H04W 76/15 |
| 2018/0092085 A1* | 3/2018 | Shaheen | H04W 36/14 |
| 2018/0146398 A1* | 5/2018 | Kim | H04W 72/0406 |
| 2018/0167933 A1* | 6/2018 | Yin | H04W 72/0413 |
| 2018/0176834 A1* | 6/2018 | Wei | H04W 36/0066 |
| 2018/0220344 A1* | 8/2018 | Shaheen | H04W 4/60 |
| 2018/0343635 A1* | 11/2018 | Edge | G01S 5/00 |
| 2018/0343697 A1* | 11/2018 | Hsu | H04L 5/0091 |
| 2018/0352491 A1* | 12/2018 | Shih | H04W 36/14 |
| 2019/0058997 A1* | 2/2019 | Futaki | H04W 76/27 |
| 2019/0069210 A1* | 2/2019 | Lee | H04W 36/0027 |
| 2019/0097877 A1* | 3/2019 | Yiu | H04W 41/0803 |
| 2019/0110190 A1* | 4/2019 | Van Lieshout | G06F 21/44 |
| 2019/0124572 A1* | 4/2019 | Park | H04W 76/27 |
| 2019/0149421 A1* | 5/2019 | Jin | H04L 5/0053 370/331 |
| 2019/0150037 A1* | 5/2019 | Mildh | H04W 36/0022 |
| 2019/0159273 A1* | 5/2019 | Shi | H04W 76/12 |
| 2019/0166523 A1* | 5/2019 | Shaw | H04W 76/16 |
| 2019/0182693 A1* | 6/2019 | Zhang | H04W 36/30 |
| 2019/0182737 A1* | 6/2019 | Futaki | H04W 36/14 |
| 2019/0191348 A1* | 6/2019 | Futaki | H04W 36/12 |
| 2019/0215747 A1* | 7/2019 | Wu | H04W 8/24 |
| 2019/0215798 A1* | 7/2019 | Kim | H04L 5/0055 |
| 2019/0215886 A1* | 7/2019 | Lee | H04W 48/10 |
| 2019/0254097 A1* | 8/2019 | Prasad | H04W 12/08 |
| 2019/0268819 A1* | 8/2019 | Kim | H04W 36/08 |
| 2019/0297538 A1* | 9/2019 | Keller | H04W 36/0022 |
| 2019/0342804 A1* | 11/2019 | Futaki | H04W 36/0069 |
| 2019/0342824 A1* | 11/2019 | Futaki | H04W 76/15 |
| 2019/0349906 A1* | 11/2019 | Futaki | H04W 36/14 |
| 2019/0357095 A1* | 11/2019 | Pakniat | H04W 36/0083 |
| 2019/0357101 A1* | 11/2019 | Stojanovski | H04W 36/0022 |
| 2019/0357131 A1* | 11/2019 | Sivavakeesar | H04W 36/00835 |
| 2019/0357199 A1* | 11/2019 | Ali | H04W 72/048 |
| 2019/0373519 A1* | 12/2019 | Yiu | H04W 36/30 |
| 2019/0387401 A1* | 12/2019 | Liao | H04W 12/082 |
| 2019/0394651 A1* | 12/2019 | Wifvesson | H04L 63/0428 |
| 2020/0053716 A1* | 2/2020 | Xu | H04W 72/048 |
| 2020/0213836 A1* | 7/2020 | Kim | H04W 8/24 |
| 2020/0214065 A1* | 7/2020 | Tomala | H04W 80/02 |
| 2020/0267791 A1* | 8/2020 | Yilmaz | H04W 76/16 |
| 2020/0288347 A1* | 9/2020 | Kim | H04W 80/02 |

FOREIGN PATENT DOCUMENTS

| | | |
|---|---|---|
| WO | 2014/146723 A1 | 9/2014 |
| WO | 2016/064458 A1 | 4/2016 |
| WO | 2017/092814 A1 | 6/2017 |
| WO | 2017/185199 A1 | 11/2017 |
| WO | 2017/195471 A1 | 11/2017 |

OTHER PUBLICATIONS

Search Report dated Feb. 19, 2019 for EP application No. 19150978.5, pp. 1~6.

Ericsson, "UE context handling during inter RAT handover", 3GPP TSG-RAN WG2 #96, Tdoc R2-168302, Nov. 14-18, 2016, Reno, Nevada, USA, XP051177952, pp. 1-3.

NEC, "Handover procedure from 5GS to EPS", 3GPP TSG SA WG3 (Security) Meeting #89, S3-173335, Nov. 27-Dec. 1, 2017, Reno (US), XP051380634, pp. 1-3.

Ericsson, "UE context handling during inter RAT handover", 3GPP TSG-RAN WG2 #100, Tdoc R2-1713308, Reno, Nevada, USA, Nov. 27-Dec. 1, 2017, pp. 1-3.

Ericsson, "NR RRC procedure for inter-RAT handover", 3GPP TSG-RAN WG2 #100, R2-1713397, Reno, Nevada, USA, Nov. 27-Dec. 1, 2017, pp. 1-10.

ITRI, "UE capability coordination mechanism for LTE-NR tight interworking", 3GPP TSG-RAN WG2 NR Ad Hoc, Tdoc R2-1700260, Spokane, USA, Jan. 17-19, 2017, pp. 1-4.

Office action dated Oct. 7, 2019 for the Taiwan application No. 108100707, filing date Jan. 8, 2019, pp. 1-20.

Office action dated Dec. 3, 2020 for the China application No. 201910020217.1, filing date Jan. 9, 2019, pp. 1-13.

Notice of allowance dated Nov. 5, 2021 for the China application No. 201910020217.1, filing date Jan. 9, 2019, p. 1-4.

* cited by examiner

DEVICE AND METHOD FOR HANDLING NEW RADIO CAPABILITIES

CROSS REFERENCE TO RELATED APPLICATIONS

This application claims the benefits of U.S. Provisional Applications No. 62/615,410 filed on Jan. 9, 2018 and No. 62/615,941 filed on Jan. 10, 2018, which are incorporated herein by reference.

BACKGROUND OF THE INVENTION

1. Field of the Invention

The present invention relates to a device and a method used in a wireless communication system, and more particularly, to a device and a method of handling new radio (NR) capabilities in a wireless communication system.

2. Description of the Prior Art

Recently, a fifth generation (5G) system (or called next generation system) has been developed by the 3rd Generation Partnership Project (3GPP). When a communication device needs to hand over from a network to another network, it is still unknown how to handle the capabilities of the networks with different radio access technologies (RATS).

SUMMARY OF THE INVENTION

The present invention therefore provides a communication device for handling NR capabilities for an inter-RAT handover to solve the abovementioned problem.

A network comprising a first base station (BS) of a new radio (NR) Radio Access Network (NR-RAN) and a second BS of an Evolved Universal Terrestrial Radio Access (E-UTRA) Network (E-UTRAN) for handling NR capabilities comprises at least one storage device for storing instructions and at least one processing circuit coupled to the at least one storage device. The at least one processing circuit is configured to execute the instructions stored in the at least one storage device. The instructions comprise the first BS transmitting at least one E-UTRA capability and at least one first NR capability of a communication device to the second BS; the second BS generating a Radio Resource Control (RRC) Connection Reconfiguration message according to the at least one E-UTRA capability and the at least one first NR capability, wherein the RRC Connection Reconfiguration message comprises at least one E-UTRA configuration and a NR configuration; the second BS transmitting the RRC Connection Reconfiguration message to the first BS; the first BS generating a first NR-access RRC message comprising the RRC Connection Reconfiguration message; the first BS transmitting the first NR-access RRC message to the communication device; and the second BS receiving a RRC Connection Reconfiguration Complete message from the communication device, in response to the RRC Connection Reconfiguration message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
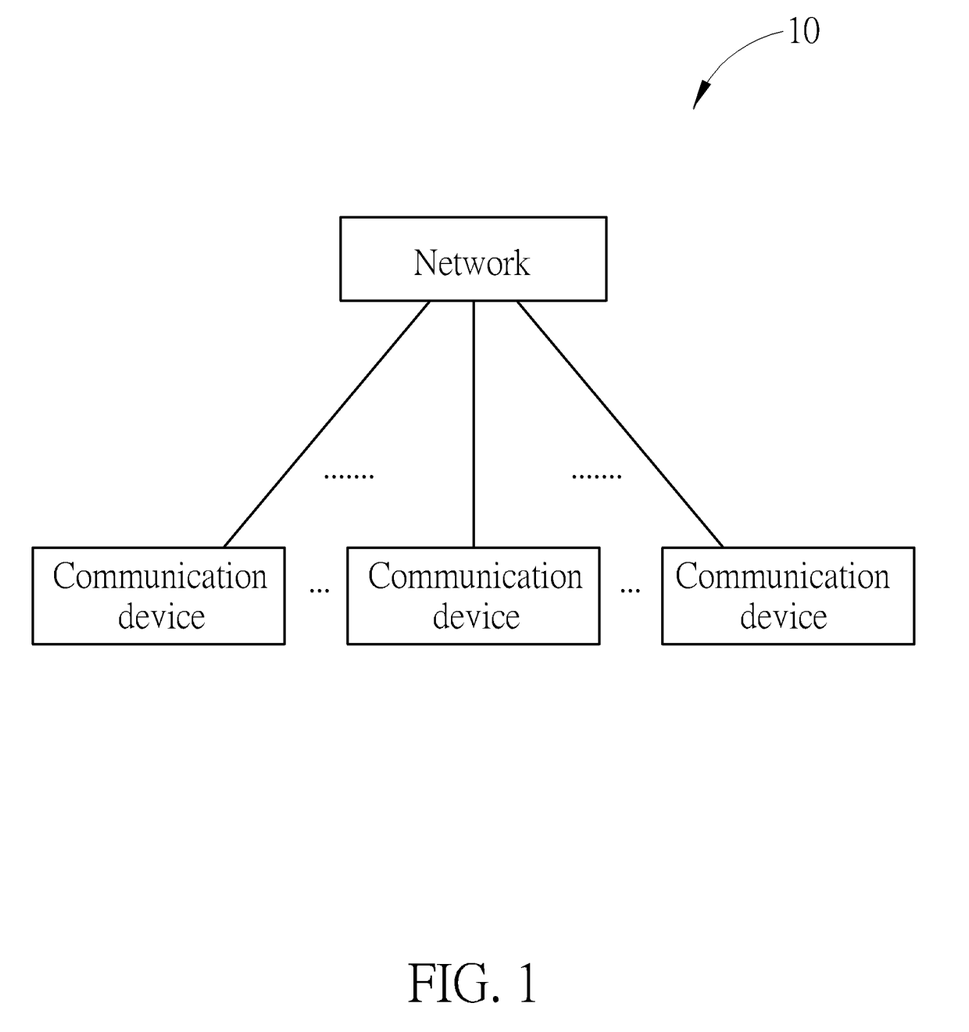
FIG. 1 is a schematic diagram of a wireless communication system according to an example of the present invention.

In FIG. 1, a network and communication devices are simply utilized for illustrating the structure of a wireless communication system 10. Practically, the network includes at least one of a long-term evolution (LTE) network, an evolved LTE network, a new radio (NR) network and a sixth generation (6G) network. The 6G radio communication technology may employ orthogonal frequency-division multiplexing (OFDM) or non-OFDM, a wider bandwidth (e.g., 1 GHz, 2 GHz or 5 GHz) and a transmission time interval (TTI) shorter than 1 ms (e.g., 1, 2, 3 or 4 OFDM symbols, or 100 or 200 us) for communication between the communication devices and a 6G base station (BS).

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
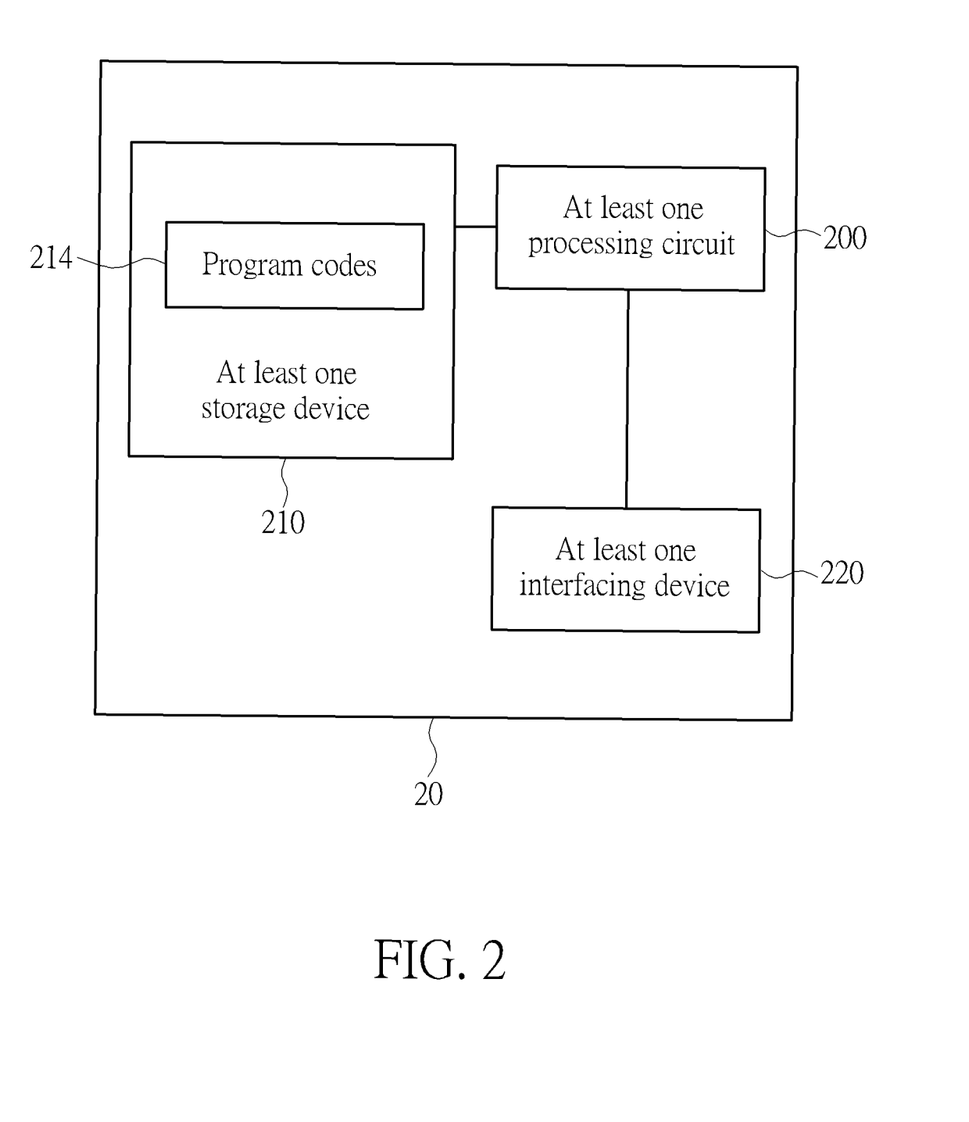
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214 accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver used to transmit and receive signals (e.g., data, messages and/or packets) according to processing results of the at least one processing circuit 200.

In the following examples, a UE is used for representing a communication device in FIG. 1, to simplify the illustration of the examples.

Figure 3:
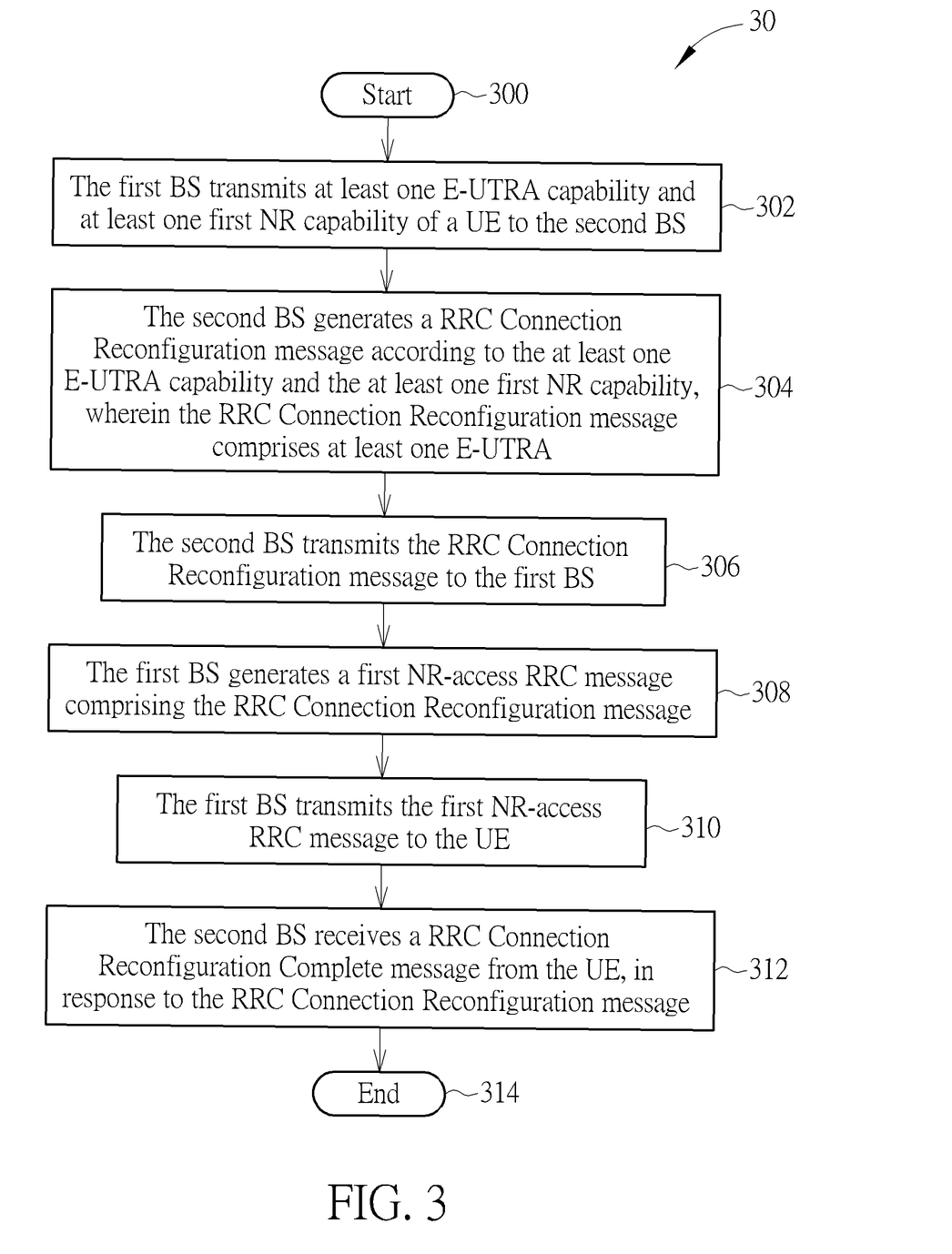
FIG. 3 is a flowchart of a process according to an example of the present invention.

A process 30 in FIG. 3 is utilized in a network including a first base station (BS) of a new radio (NR) Radio Access Network (NR-RAN) and a second BS of an Evolved Universal Terrestrial Radio Access (E-UTRA) Network (E-UTRAN) to handle NR capabilities, and includes the following steps:

Step 300: Start.

Step 302: The first BS transmits at least one E-UTRA capability and at least one first NR capability of a UE to the second BS.

Step 304: The second BS generates a Radio Resource Control (RRC) Connection Reconfiguration message according to the at least one E-UTRA capability and the at least one first NR capability, wherein the RRC Connection Reconfiguration message comprises at least one E-UTRA configuration and a NR configuration.

Step 306: The second BS transmits the RRC Connection Reconfiguration message to the first BS.

Step 308: The first BS generates a first NR-access RRC message comprising the RRC Connection Reconfiguration message.

Step 310: The first BS transmits the first NR-access RRC message to the UE.

Step 312: The second BS receives a RRC Connection Reconfiguration Complete message from the UE, in response to the RRC Connection Reconfiguration message.

Step 314: End.

According to the process 30, after the first BS transmits the first NR-access RRC message comprising the RRC Connection Reconfiguration (e.g., RRCConnectionReconfiguration) message to the UE, the second BS receives the RRC Connection Reconfiguration Complete (e.g., RRCConnectionReconfigurationComplete) message for confirming that the UE is handed over from the first BS to the second BS.

Realization of the process 30 is not limited to the above description. The following examples may be applied to the process 30.

In one example, the first BS receives the at least one E-UTRA capability and the at least one first NR capability from a core network (CN) or a third BS.

In another example, the first BS receives the at least one E-UTRA capability and the at least one first NR capability from the UE. The first BS transmits the at least one E-UTRA capability and the at least one first NR capability to the second BS via at least one CN. For example, the first BS transmits the at least one E-UTRA capability and the at least one NR capability in a first message to a first CN, and the first CN transmits a second message including the at least one E-UTRA capability and the at least one NR capability to a second CN. The second CN transmits a third message including the at least one E-UTRA capability and the at least one NR capability to the second BS. In one example, the first CN and the second CN are collocated or not collocated. If the first CN and the second CN are collocated, the second message may or may not be needed.

In one example, the at least one E-UTRA configuration or the NR configuration are generated according to the at least one first NR capability. In one example, the at least one first NR capability comprises a Packet Data Convergence Protocol (PDCP) capability (e.g., PDCP-ParametersNR-r15), and the NR configuration is a radio bearer (RB) configuration (e.g., RadioBearerConfig). The RB configuration configures at least one RB using a NR PDCP. The at least one RB comprises at least one signaling RB (SRB) or at least one data RB (DRB). In one example, the at least one E-UTRA configuration include a physical layer configuration, a medium access control (MAC) configuration or a radio link control (RLC) configuration. In one example, the at least one E-UTRA configuration includes at least one SRB configuration or at least one DRB configuration. In one example, the second BS generates the RRCConnectionReconfiguration message (i.e., an E-UTRA RRC message) including the at least one E-UTRA configuration and the NR configuration.

In one example, if the RB configuration includes a SRB configuration, the UE communicates (e.g., transmits/receives) at least one E-UTRA RRC message (including the RRCConnectionReconfigurationComplete message) by using the NR PDCP and the at least one E-UTRA configuration with (e.g., to/from) the second BS. If the RB configuration includes a DRB configuration, the UE communicates (e.g., transmits/receives) an Internet Protocol (IP) Packet by using the NR PDCP and the at least one E-UTRA configuration with (e.g., to/from) the second BS.

In one example, the second BS transmits a fourth message including the RRCConnectionReconfiguration message to the second CN. Then, the second CN transmits the RRCConnectionReconfiguration message to the first CN. The first CN transmits the RRCConnectionReconfiguration message to the first BS. In one example, the first CN and the second CN are collocated or not collocated. If the first CN and the second CN are collocated, the transmissions between the first CN and the second CN may or may not be needed.

In one example, the first CN includes an access and mobility management (AMF), a session management function (SMF) or a user plane function (UPF). The second CN includes a mobility management entity (MME), a serving gateway or a packet data network (PDN) gateway.

In one example, the first NR-access RRC message is a Handover From NR Command message. The first BS transmits the first NR-access RRC message to the UE via a NR-access. The UE transmits the RRCConnectionReconfigurationComplete message to the second BS via an E-UTRA.

In one example, the first BS receives a second NR-access RRC message comprising the at least one E-UTRA capability and the at least one first NR capability from the UE. In one example, the second NR-access RRC message is a RRC Connection Setup Complete message or a UE Capability Information message. The UE transmits a RRC Connection Request message to the first BS, receives a RRC Connection Setup message responding the RRC Connection Request message from the first BS, and transmits the RRC Connection Setup Complete message responding the RRC Connection Setup message to the first BS. In another example, the second NR-access RRC message is a UE Capability Information message. The UE transmits the UE Capability Information message responding a UE Capability Enquiry message received by the UE from the first BS.

In one example, the at least one E-UTRA capability and the at least one first NR capability are in an E-UTRA RRC format and are included in a UE-EUTRA-Capability information element (IE).

In one example, when the second BS receives the RRCConnectionReconfigurationComplete message, the second BS connects to the UE via the E-UTRA. The second BS transmits a UE Capability Enquiry message (i.e., an E-UTRA RRC message) to the UE. The UE Capability Enquiry message comprises a first indication indicating the UE to transmit at least one second NR capability to the second BS. The UE Capability Enquiry message comprises a second indication indicating the UE to transmit at least one third NR capability to the second BS in addition to the first indication. The UE includes the at least one second NR capability in the UE Capability Information message (i.e., the E-UTRA RRC message), in response to the first indication. The UE includes the at least one third NR capability in the UE Capability Information message (i.e., the E-UTRA RRC message), in response to the second indication. The UE may not transmit either the at least one second NR capability or the at least one third capability to the first BS.

In one example, the UE includes the at least one second NR capability in a UE-NR-Capability IE included in the UE Capability Information message, and includes the at least one third NR capability in a UE-MRDC-CapabilityIE included in the UE Capability Information message. In one example, the UE includes the at least one second NR capability in a UE-MRDC-Capability IE included in the UE Capability Information message, and includes the at least one third NR capability in a UE-NR-Capability IE included in the UE Capability Information message. The second BS may or may not include the first indication and the second indication in the same UE Capability Enquiry message. The UE may or may not include the at least one second NR capability and the at least one third NR capability in the same UE Capability Information message.

In one example, after transmitting the RRCConnectionReconfigurationComplete message to the second BS, the UE transmits the at least one first NR capability in the UE Capability Information message (i.e., the E-UTRA RRC message) to the second BS. Alternatively, the UE does not transmit the at least one first NR capability to the second BS, after transmitting the RRCConnectionReconfigurationComplete message to the second BS.

In one example, the UE transmits the UE-EUTRA-Capability including the at least one E-UTRA capability and the at least one first NR capability in the UE Capability Information message (i.e., the E-UTRA RRC message) to the second BS in response to an E-UTRA indication, if the UE Capability Enquiry message (i.e., the E-UTRA RRC message) received from the second BS includes the E-UTRA indication.

In one example, the at least one first NR capability is the NR PDCP capability. In one example, the at least one first NR capability is a support of E-UTRA NR Dual Connectivity (EN-DC) or at least one supported NR band.

In one example, the UE transmits at least one fourth NR capability to the first BS in the second NR-access RRC message. The at least one fourth NR capability includes the support of EN-DC or at least one supported NR band which may not be included in the at least one first NR capability.

In one example, after transmitting the RRCConnectionReconfigurationComplete message to the second BS, the UE transmits the at least one fourth NR capability in the UE Capability Information message (i.e., the E-UTRA RRC message) to the second BS. Alternatively, the UE does not transmit the at least one fourth NR capability to the second BS after transmitting the RRCConnectionReconfigurationComplete message to the second BS.

In one example, the UE transmits the fourth NR capability in the UE Capability Information message (i.e., the E-UTRA RRC message) to the second BS in response to the E-UTRA indication, if the UE Capability Enquiry message (i.e., the E-UTRA RRC message) received from the second BS includes the E-UTRA indication.

In one example, the second BS transmits a second RRC-ConnectionReconfiguration message (e.g., an E-UTRA RRC message) to the UE. The second BS includes a NR configuration in the second RRCConnectionReconfiguration message according to the at least one first NR capability, the at least one second NR capability or the at least one third NR capability. The second BS receives a second RRCConnectionReconfigurationComplete message from the UE, in response to the second RRCConnectionReconfiguration message.

The first BS releases NR configurations configured to the UE when the first BS knows the UE is handed over to the second BS as described above. The UE also releases the NR configurations when the UE hands over to the second BS. For example, the UE releases the NR configurations when transmitting the RRCConnectionReconfigurationComplete message to the second BS.

In the process 30 and the examples above, the "NR-RAN" may be replaced by a "Universal Terrestrial Radio Access (UTRA) Network (UTRAN)" to support an inter-RAT handover from a Universal Mobile Telecommunications System (UMTS) to the E-UTRA. The first BS is a BS of the UTRAN instead of a NR BS (e.g., next-generation Node-B (gNB)). "NR-access" is replaced by "UTRA". In this case, the first BS of the UTRAN transmit a UE-EUTRA-Capability including the at least one E-UTRA capability and the at least one first NR capability to the second BS of the E-UTRAN.

Figure 4:
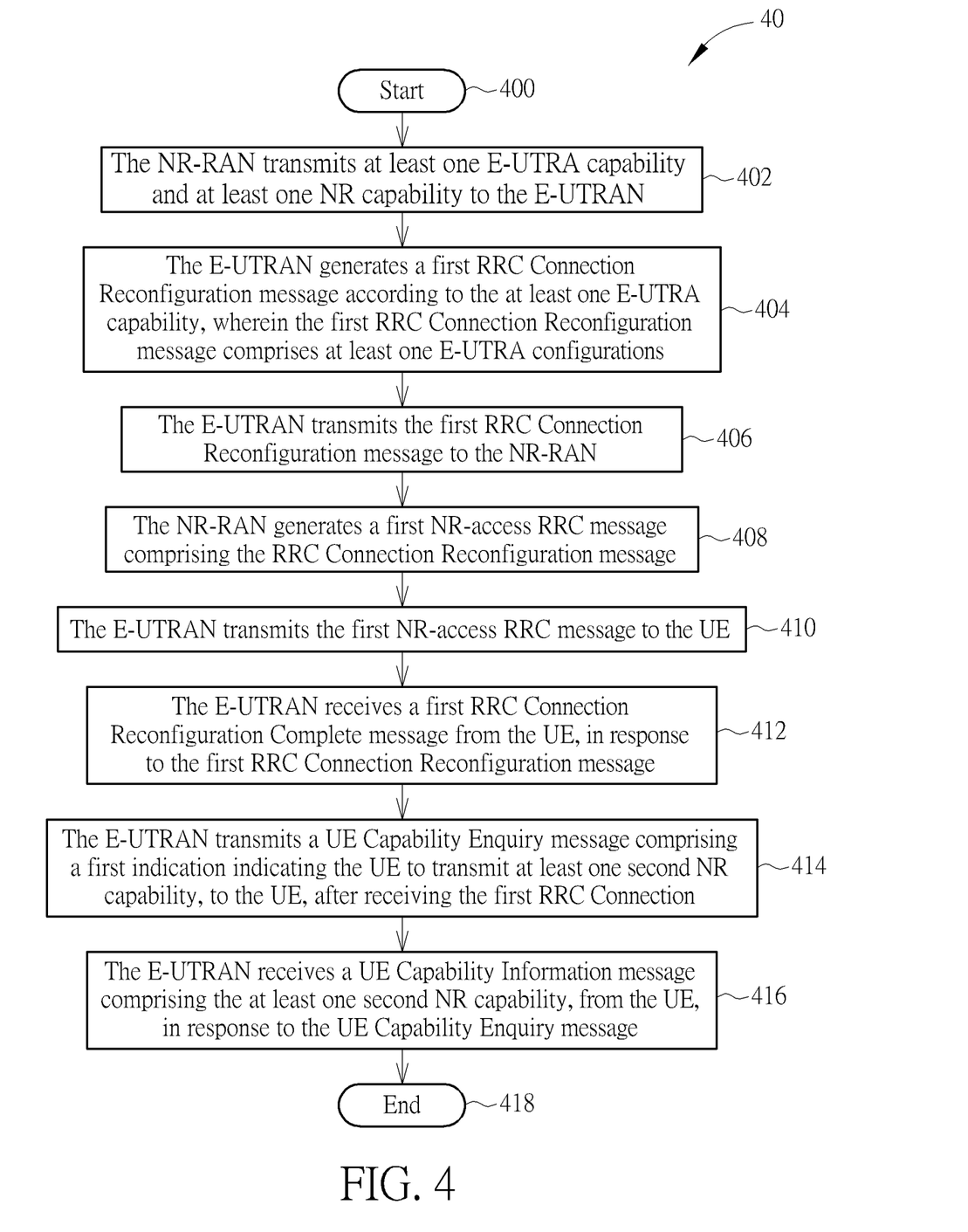
FIG. 4 is a flowchart of a process according to an example of the present invention.

A process 40 in FIG. 4 is utilized in a network including a NR-RAN and an E-UTRAN to handle NR capabilities, and includes the following steps:

Step 400: Start.

Step 402: The NR-RAN transmits at least one E-UTRA capability and at least one NR capability to the E-UTRAN.

Step 404: The E-UTRAN generates a first RRC Connection Reconfiguration message according to the at least one E-UTRA capability, wherein the first RRC Connection Reconfiguration message comprises at least one E-UTRA configurations.

Step 406: The E-UTRAN transmits the first RRC Connection Reconfiguration message to the NR-RAN.

Step 408: The NR-RAN generates a first NR-access RRC message comprising the RRC Connection Reconfiguration message.

Step 410: The E-UTRAN transmits the first NR-access RRC message to the UE.

Step 412: The E-UTRAN receives a first RRC Connection Reconfiguration Complete message from the UE, in response to the first RRC Connection Reconfiguration message.

Step 414: The E-UTRAN transmits a UE Capability Enquiry message comprising a first indication indicating the UE to transmit at least one second NR capability, to the UE, after receiving the first RRC Connection Reconfiguration Complete message.

Step 416: The E-UTRAN receives a UE Capability Information message comprising the at least one second NR capability, from the UE, in response to the UE Capability Enquiry message.

Step 418: End.

According to the process 40, the UE is handed over from the NR-RAN to the E-UTRAN. Then, the E-UTRAN receives the at least one second NR capability from the UE in the UE Capability Information.

Realization of the process 40 is not limited to the above description. The following examples may be applied to the process 40.

In one example, the NR-RAN includes at least one BS (e.g., gNB) and the E-UTRAN includes at least one BS (e.g., evolved Node-B (eNB)).

In one example, the NR-RAN receives the at least one E-UTRA capability and the at least one first NR capability from a UE.

In one example, the E-UTRAN includes a second indication indicating the UE to transmit at least one third NR capability to the E-UTRAN, in the UE Capability Enquiry message. In this case, the UE Capability Information message includes the at least one third NR capability.

In one example, the first RRCConnectionReconfiguration message includes or does not include a NR configuration. In one example, the E-UTRAN transmits a second RRCConnectionReconfiguration message to the UE. The second RRCConnectionReconfiguration message includes a NR configuration according to the at least one first NR capability, the at least one second NR capability or the at least one third NR capability. The E-UTRAN receives a second RRCConnectionReconfigurationComplete message from the UE, in response to the second RRCConnectionReconfiguration message.

In one example, the at least one first NR capability is the NR PDCP capability. In one example, the at least one first NR capability is the support of EN-DC or the at least one supported NR band.

In one example, the E-UTRAN transmits a measurement configuration configuring the UE to measure a NR carrier frequency indicated in the at least one supported NR band. The UE transmits a Measurement Report message including a measurement result to the E-UTRAN. The UE measures the NR carrier frequency to obtain (or generate) the measurement result.

Examples of the process 30 can be applied to the process 40 and are not narrated herein. For example, the NR-RAN includes the first BS in the process 30 and the E-UTRAN includes the second BS in the process 30.

Figure 5:
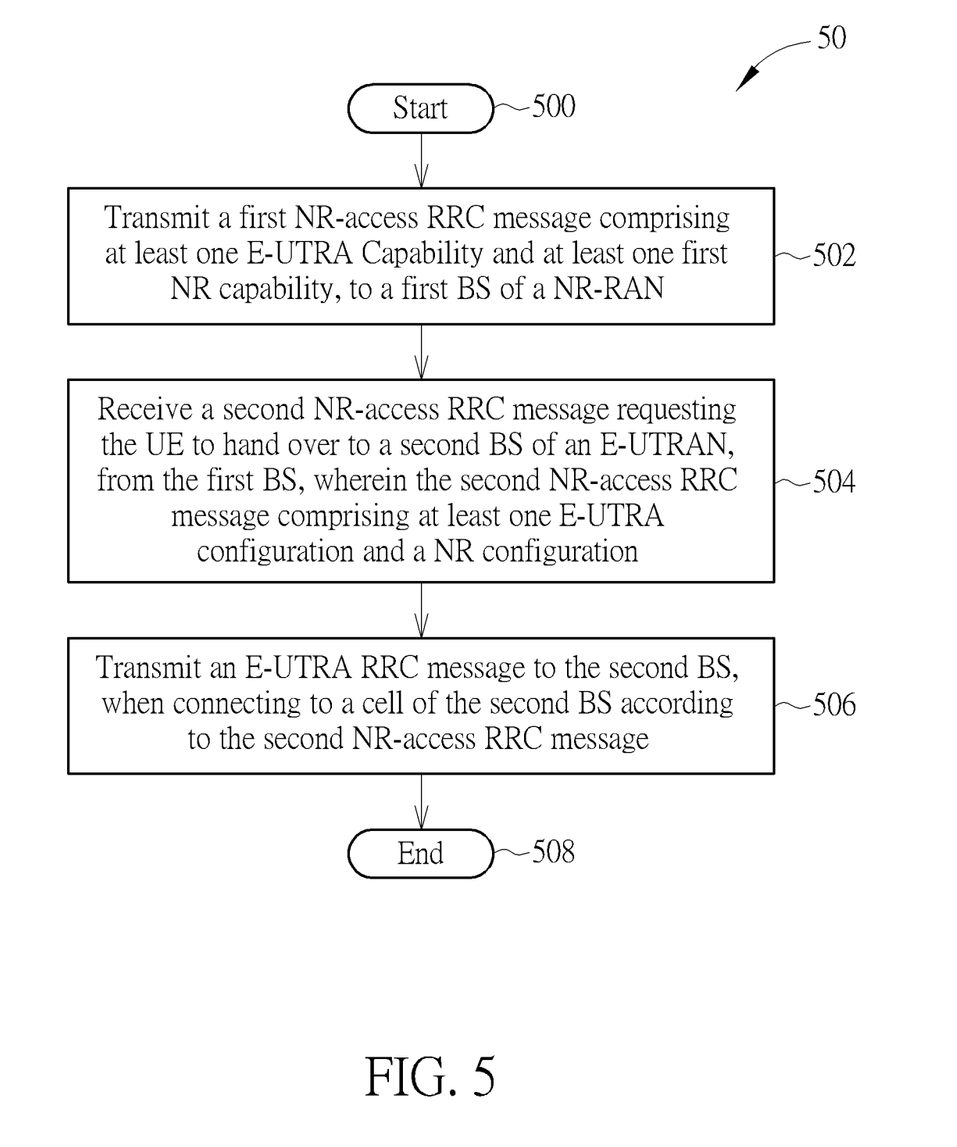
FIG. 5 is a flowchart of a process according to an example of the present invention.

A process 50 in FIG. 5 is utilized in a UE to handle NR capabilities, and includes the following steps:

Step 500: Start.

Step 502: Transmit a first NR-access RRC message comprising at least one E-UTRA Capability and at least one first NR capability, to a first BS of a NR-RAN.

Step 504: Receive a second NR-access RRC message requesting the UE to hand over to a second BS of an E-UTRAN, from the first BS, wherein the second NR-access RRC message comprising at least one E-UTRA configuration and a NR configuration.

Step 506: Transmit an E-UTRA RRC message to the second BS, when connecting to a cell of the second BS according to the second NR-access RRC message.

Step 508: End.

According to the process 50, a handover for the UE from the first BS to the second BS is completed according to the first NR-access RRC message and the second NR-access RRC message. After the handover, the UE communicates with the second BS when connecting to the second BS.

Realization of the process 50 is not limited to the above description. The following examples may be applied to the process 50.

In one example, the UE transmits the at least one first NR capability to the first BS, when the first BS belongs to a first public land mobile network (PLMN). The UE does not transmit the at least one first NR capability to a third BS of a NR-RAN, when the third BS belongs to a second PLMN different from the first PLMN. That is, the UE determines whether to transmit the at least one NR capability to a BS depending on a PLMN of the BS. If the PLMN is the first PLMN, the UE includes the at least one first NR capability in the first NR-RAN access RRC message. If the PLMN is the second PLMN, the UE does not include the at least one first NR capability in the first NR-RAN access RRC message.

In one example, the UE transmits the at least one first NR capability in the first NR-RAN access RRC message to the first BS irrespective of the PLMN(s).

In one example, the first NR-access RRC message is a RRC Connection Setup Complete message or a UE Capability Information message. In one example, the second NR-access RRC message is a Handover From NR Command message. The second NR-access RRC message includes a RRCConnectionReconfiguration message including the at least one E-UTRA configuration and the NR configuration. The first E-UTRA RRC message is an RRCConnectionReconfigurationComplete message responding the RRCConnectionReconfiguration message.

Examples of the process 30 can be applied to the process 50 and are not narrated herein.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a device for handling NR capabilities for an inter-RAT handover. The inter-RAT handover is completed according to the RRC messages including the E-UTRA capabilities and the NR capabilities. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS) of a new radio (NR) Radio Access Network (NR-RAN) and a second BS of an Evolved Universal Terrestrial Radio Access (E-UTRA) Network (E-UTRAN) for handling NR capabilities, comprising:

at least one storage device; and at least one processing circuit, coupled to the at least one storage device, wherein the at least one storage device stores, and the at least one processing circuit is configured to execute instructions of:

the first BS receiving at least one E-UTRA capability and at least one first NR capability from a user equipment (UE);

the first BS transmitting the at least one E-UTRA capability and the at least one first NR capability of the UE to the second BS via at least one core network (CN);

the second BS generating a Radio Resource Control (RRC) Connection Reconfiguration message according to the at least one E-UTRA capability and the at least one first NR capability, wherein the RRC Connection Reconfiguration message comprises at least one E-UTRA configuration and a NR configuration;

the second BS transmitting the RRC Connection Reconfiguration message to the first BS;

the first BS generating a first NR-access RRC message comprising the RRC Connection Reconfiguration message;

the first BS transmitting the first NR-access RRC message to the UE; and the second BS receiving a RRC Connection Reconfiguration Complete message from the UE, in response to the RRC Connection Reconfiguration message.

2. The network of claim 1, wherein the at least one E-UTRA configuration and the NR configuration are generated according to the at least one first NR capability.

3. The network of claim 2, wherein the at least one first NR capability comprises a Packet Data Convergence Protocol (PDCP) capability, and the NR configuration comprises a radio bearer (RB) configuration.

4. The network of claim 1, wherein the instructions further comprise:
the second BS transmitting a UE Capability Enquiry message to the UE, wherein the UE Capability Enquiry message comprises at least one indication indicating the UE to transmit at least one second NR capability to the second BS.

5. A network comprising a new radio (NR) Radio Access Network (NR-RAN) and an Evolved Universal Terrestrial Radio Access (E-UTRA) Network (E-UTRAN) for handling NR capabilities, comprising:
at least one storage device; and
at least one processing circuit, coupled to the at least one storage device, wherein the at least one storage device stores, and the at least one processing circuit is configured to execute instructions of:
the NR-RAN transmitting at least one E-UTRA capability and at least one first NR capability to the E-UTRAN;
the E-UTRAN generating a first Radio Resource Control (RRC) Connection Reconfiguration message according to the at least one E-UTRA capability, wherein the first RRC Connection Reconfiguration message comprises at least one E-UTRA configurations;
the E-UTRAN transmitting the first RRC Connection Reconfiguration message to the NR-RAN;
the NR-RAN generating a first NR-access RRC message comprising the first RRC Connection Reconfiguration message;
the E-UTRAN transmitting the first NR-access RRC message to a user equipment (UE);
the E-UTRAN receiving a first RRC Connection Reconfiguration Complete message from the UE, in response to the first RRC Connection Reconfiguration message;
the E-UTRAN transmitting a UE Capability Enquiry message comprising a first indication indicating the UE to transmit at least one second NR capability, to the UE, after receiving the first RRC Connection Reconfiguration Complete message;
the E-UTRAN receiving a UE Capability Information message comprising the at least one second NR capability, from the UE, in response to the UE Capability Enquiry message;
the E-UTRAN transmitting a second RRC Connection Reconfiguration message to the UE, wherein the second RRC Connection Reconfiguration message comprises a NR configuration; and
the E-UTRAN receiving a second RRC Connection Reconfiguration Complete message from the UE, in response to the second RRC Connection Reconfiguration message.

6. The network of claim 5, wherein the UE Capability Enquiry message comprises a second indication indicating the UE to transmit at least one third NR capability to the E-UTRAN.

7. A user equipment (UE) for handling new radio (NR) capabilities, comprising:
at least one storage device; and
at least one processing circuit, coupled to the at least one storage device, wherein the at least one storage device stores, and the at least one processing circuit is configured to execute instructions of:
transmitting a first NR-access radio resource control (RRC) message comprising at least one Evolved Universal Terrestrial Radio Access (E-UTRA) Capability and at least one first NR capability, to a first base station (BS) of a NR Radio Access Network (NR-RAN);
receiving a second NR-access RRC message requesting the UE to hand over to a second BS of an E-UTRA Network (E-UTRAN), from the first BS, wherein the second NR-access RRC message comprising at least one E-UTRA configuration and a NR configuration;
transmitting an E-UTRA RRC message to the second BS, when connecting to a cell of the second BS according to the second NR-access RRC message;
receiving a RRC Connection Reconfiguration message from the second BS, wherein the RRC Connection Reconfiguration message comprises a NR configuration; and
transmitting a RRC Connection Reconfiguration Complete message to the second BS, in response to the RRC Connection Reconfiguration message.

8. The UE of claim 7, wherein the at least one E-UTRA configuration and the NR configuration are generated according to the at least one first NR capability.

9. The UE of claim 7, wherein the second NR-access RRC message is a Handover From NR Command message, and the E-UTRA RRC message is a RRC Connection Reconfiguration Complete message.

10. The UE of claim 7, wherein the instructions further comprise:
receiving a UE Capability Enquiry message from the second BS, wherein the UE Capability Enquiry message comprises at least one indication indicating the UE to transmit at least one second NR capability to the second BS; and
transmitting a UE Capability Information message to the second BS, wherein the UE Capability Information message comprises the at least one second NR capability.

* * * * *